P. A. Wise.
Horse Hay Fork.
No. 55408. Patented Jun. 5, 1866.
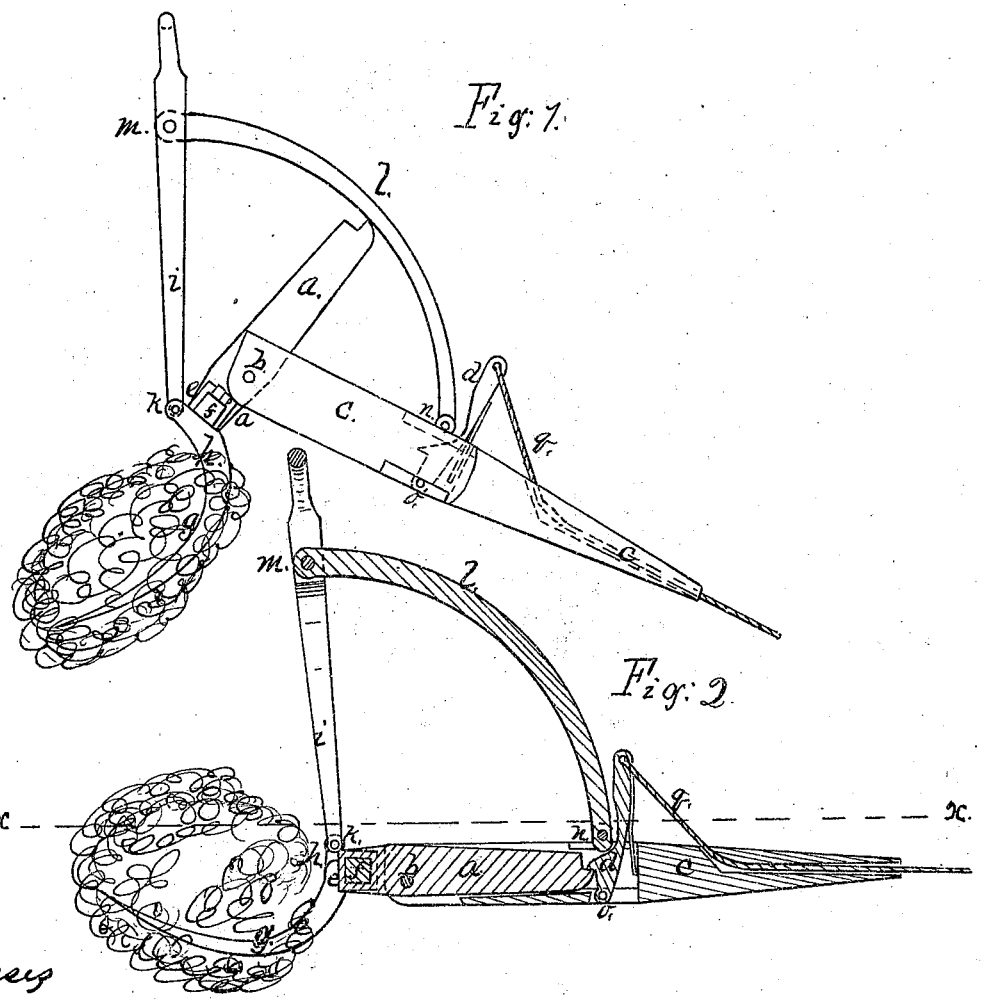
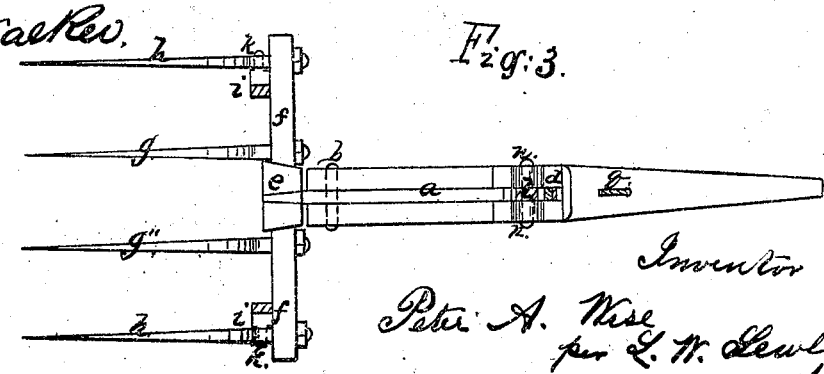
Witnesses
Chas. H. Smith.
Geo. D. Walker.
Inventor
Peter A. Wise
per L. W. Sewll
Atty.

UNITED STATES PATENT OFFICE.

PETER A. WISE, OF STOCKBRIDGE, NEW YORK.

IMPROVEMENT IN HORSE HAY-FORKS.

Specification forming part of Letters Patent No. 55,408, dated June 5, 1866; antedated December 5, 1865.

*To all whom it may concern:*

Be it known that I, PETER A. WISE, of Stockbridge, in the county of Madison and State of New York, have invented, made, and applied to use a certain new and useful Improvement in Hay-Elevating Forks; and I do hereby declare the following to be a full, clear, and exact description of the same, reference being had to the annexed drawings, making part of this specification, wherein—

Figure 1 is a side elevation of the fork in the position it assumes when the hay is discharged. Fig. 2 is a section longitudinally of said fork in the position for sustaining the hay to be raised, and Fig. 3 is a sectional plan below the line $x\ x$, Fig. 2.

Similar marks of reference denote the same parts.

Hay-forks have heretofore been made so that they could be used with a rope for raising the hay upon the tines or as an ordinary hand-fork.

My invention relates solely to a fork adapted to elevating hay or similar material by power applied to a rope or chain, and from which fork the hay is discharged by pulling a cord or rope.

My invention consists in a hay-elevating fork formed with tines attached to a cross-head, and provided with a metal shank extending from the rake-head along the handle, and to which shank the handle is hinged, so that the shank swings upward as the hay is discharged, to effect which a latch that connects the moving end of the shank to the handle is drawn back; and I employ a brace extending from the bail to the handle, which causes the fork to be self-sustaining and renders it unnecessary to apply any power to hold the end of the handle or stale as the hay is lifted.

In the drawings, $a$ is the shank, united by a bolt, $b$, or hinge to the handle or stale $c$. The handle $c$ is to have a mortise or slot in it for the reception of the said shank $a$, but when the shank is disconnected from the latch $d$, as seen in Fig. 1, the shank is free to turn or swing up out of the said slot in the handle.

At the end of the shank $a$ is a box, $e$, receiving the metal bar $f$, that forms the rake-head; or said shank and rake-head may be formed together or attached to each other in any desired manner.

$g\ g$ are tines secured to the rake-head by their shanks passing through holes in said head $f$; or the box $e$ may be extended so as to set against the under sides of the tines and aid in their support.

$h\ h$ are the outer tines attached to the rake-head $f$, the same as the tines $g$, but formed with eyes at $k\ k$, receiving and forming hinges for the bail $i$, to the upper end of which bail $i$ the hoisting chain or rope is affixed, as usual.

$l$ is a brace united by a bolt or rivet at $m$ to the bail $i$, and extending to the box or eyes at $n$ on the handle $c$.

The latch $d$ is fitted with a spring that causes the shoulder of the latch to take over the end of the shank $a$, as seen in Fig. 2. This latch $d$ is on a fulcrum-pin, $o$, and is acted upon by a cord or rope, $q$, that passes from its upper end through a hole in the handle $c$, or in any other convenient manner.

It will be now apparent that the bail, being attached to the tines, relieves the shanks of those tines passing into the head from some of the strain that would otherwise be upon them; also, that the latch $d$ has but little strain upon it, and hence can be moved with ease, because the joint $b$ is between the eyes $k$ and the latch $d$, and that joint moves upward in discharging the hay, the brace $l$ acting in sustaining the load with a downward pressure against said handle $c$ near the latch $d$, thus partly relieving the pressure on the latch.

What I claim, and desire to secure by Letters Patent, is—

1. The metallic shank $a$, attached to the head of the fork and passing into the slotted end of the handle $c$, to which it is attached by the cross-bolt $b$, in combination with the latch $d$, as and for the purposes specified.

2. The combination of a fork hinged to the handle, a suspending-bail, and a brace extending from the handle to the bail, substantially as specified.

In witness whereof I have hereunto set my signature this 22d day of September, A. D. 1865.

PETER A. WISE.

Witnesses:
LEMUEL W. SERRELL,
CHAS. H. SMITH.